United States Patent
Von Arx

[11] 3,756,110
[45] Sept. 4, 1973

[54] TABLE SHEAR WITH GAP-ADJUSTING MEANS

[76] Inventor: Paul Von Arx, Gelterkinderstrasse 31, CH 4450 Sissach, Switzerland

[22] Filed: Feb. 23, 1971

[21] Appl. No.: 118,141

[30] Foreign Application Priority Data
Feb. 26, 1970 Switzerland................. 2773/70

[52] U.S. Cl.............. 83/522, 83/582, 83/640, 83/699
[51] Int. Cl............................................. B23d 5/08
[58] Field of Search............... 83/640, 522, 612, 83/582, 700, 699

[56] References Cited
UNITED STATES PATENTS

| | | | |
|---|---|---|---|
| 3,218,902 | 11/1965 | Berns et al.................. | 83/640 X |
| 2,939,358 | 6/1960 | Pearson ..................... | 83/700 X |
| 2,832,142 | 4/1958 | Hoagland.................... | 83/700 X |
| 3,371,569 | 3/1968 | Pearson et al. ............. | 83/640 X |
| 343,987 | 6/1886 | Donnell ...................... | 83/640 |
| 2,525,401 | 10/1950 | Dehn .......................... | 83/612 |
| 2,832,411 | 4/1958 | Richards et al.............. | 83/699 X |
| 3,241,353 | 3/1966 | Putetti ........................ | 83/700 X |

FOREIGN PATENTS OR APPLICATIONS

| | | | |
|---|---|---|---|
| 13,890 | 6/1914 | Great Britain................ | 83/700 |
| 76,727 | 7/1948 | Czechoslovakia............ | 83/700 |

*Primary Examiner*—Frank T. Yost
*Attorney*—Karl F. Ross

[57] ABSTRACT

A table shear has a vertically reciprocable blade which co-operates with the edge of a table to cut off the portion of a workpiece that projects over this table edge. The plane in which the blade reciprocates can be shifted adjustably toward and away from the table edge by an apparatus including a fixed guide track on which rides a wedge-shaped body that serves as the blade guide. Displacement of the guide body along the guide track by means of a threaded spindle arrangement moves the blade-reciprocating plane. The spindle is provided with a calibrated disk or dial so that accurate (micrometric) settings, of the order of thousandths or ten-thousandths of a millimeter, can be made.

1 Claim, 6 Drawing Figures

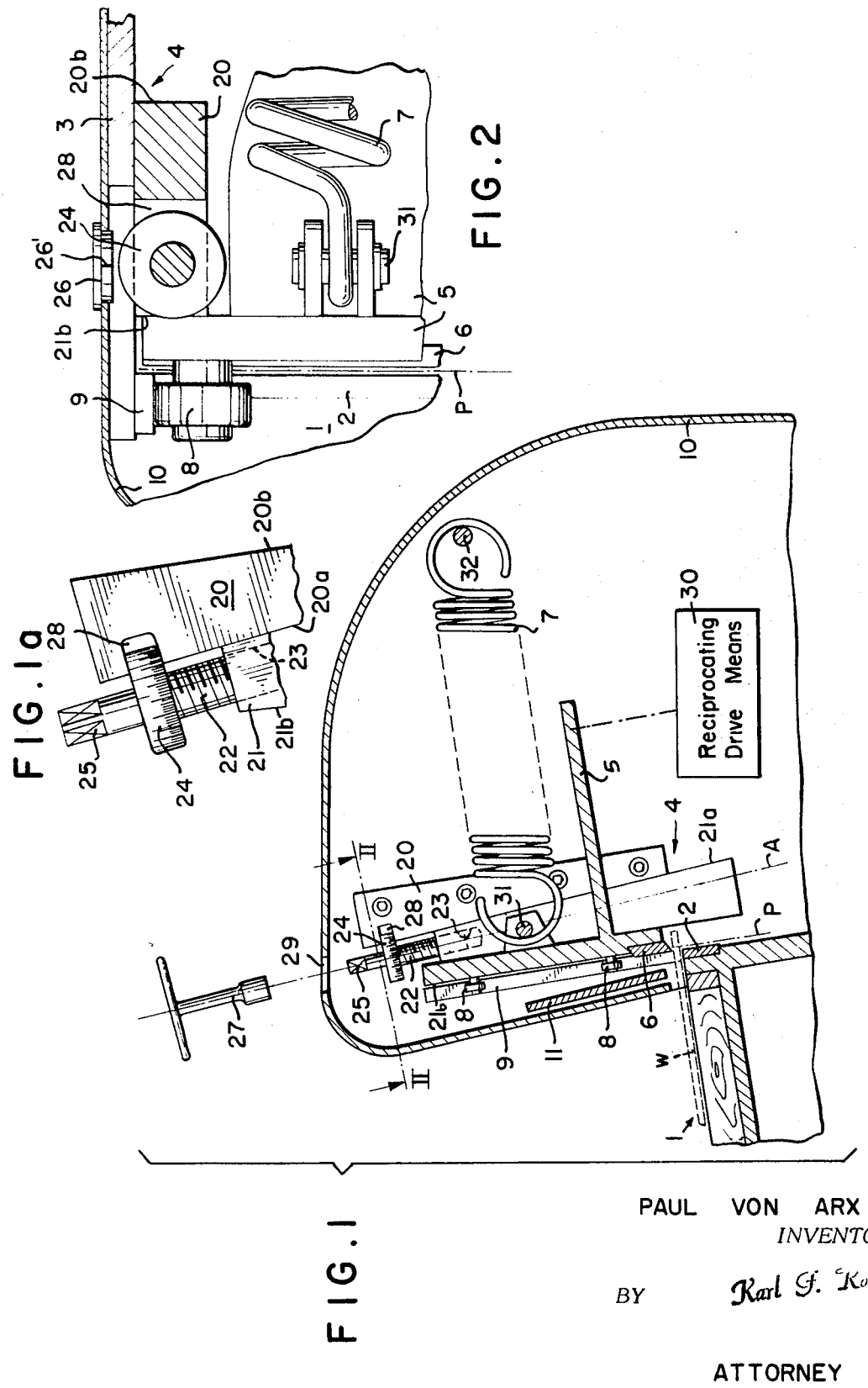

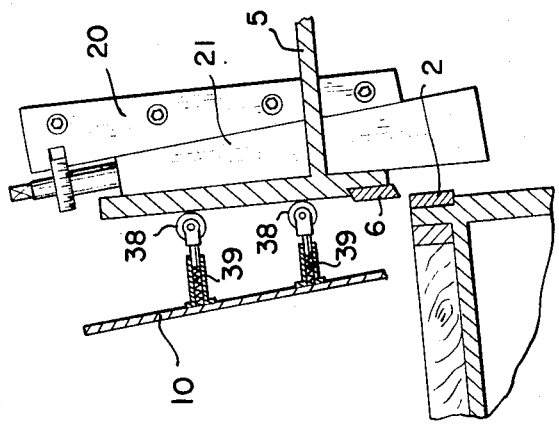
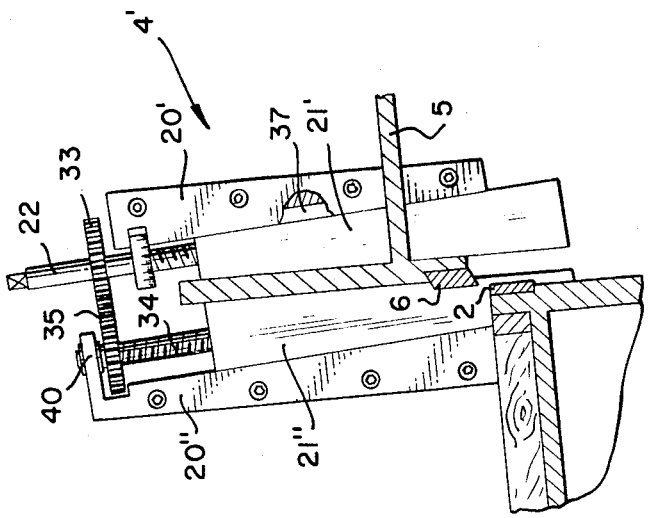

3,756,110

TABLE SHEAR WITH GAP-ADJUSTING MEANS

FIELD OF THE INVENTION

The present invention relates to a table shear and, more particularly, to a mechanism for accurately adjusting the gap or clearance between the two blades, or the blade and the table edge, of such a shear.

BACKGROUND OF THE INVENTION

A table shear of the general type described in my copending application Ser. No. 13,081 filed 20 Feb. 1970 and entitled Shearing Apparatus With Workpiece-Viewing Means (U.S. Pat. No. 3,656,391 issued 18 Apr. 1972) cuts best when it can be adjusted according to material or its thickness. In contrast with shear systems wherein the blades are in sliding contact, the moving blade should clear the stationary blade in a shear of the above type. A rule of thumb has been developed defining the gap or clearance at a maximum of 5 percent of the workpiece thickness.

The known devices for making blade-clearance adjustments generally comprise tracks in which the blade rides and screw arrangements for advancing these tracks toward or pulling them away from the table edge. An accurate setting, to a fraction of millimeter for example, as needed when cutting thin metal foils is virtually impossible to make, and the high stresses encountered in cutting quickly wear the adjustment device so that play develops and the shear becomes virtually useless.

OBJECTS OF THE INVENTION

It is therefore an object of the present invention to provide an improved table shear of the general character described.

Another object is to provide such an apparatus wherein the clearance between the two cutting edges can be adjusted easily and accurately.

Yet another object is the provision of a trouble-free adjustment apparatus which is less prone to wear than earlier adjustment mechanisms.

SUMMARY OF THE INVENTION

These objects are obtained according to the present invention by a shear having a table with an edge and adapted to receive a workpiece with a portion of the workpiece projecting beyond the edge. A blade is reciprocable adjacent the edge in a plane extending transversely to the table and defining a gap with the edge. Means is provided for displacing the blade up and down to cut the projecting portion off the workpiece. A fixed guide track, on which a vertically displaceable wedge-shaped guide body rides, cooperates with adjustment means which shifts the guide body, with one side of the guide body engaging the guide track; the wedge or guide body has another side which is inclined to the one side engaged by the blade, to adjust the gap.

This adjustment means, according to a feature of the present invention, includes a threaded spindle received in a bore in the guide body which extends parallel to the track. The spindle is axially fixed relative to the track so that its rotation moves the guide body axially. Conversely it is possible to thread the spindle into some fixed part of the machine and to couple it axially to the guide body.

The table shear according to the present invention is very easy to adjust. A simple key or wrench can be used to turn the spindle and a mechanical advantage is obtained both through the threads of the spindle and the relative inclination of the surfaces of the guide body so that a very fine adjustment is possible. Both the screw and the wedge combine to form a play-free mechanism providing slight transverse movement (for adjusting the clearance) with large axial movement of the screw and wedge.

In accordance with another feature of the present invention a pair of such tracks, guide bodies, and adjustment means is provided at each side of the blade. In addition, indicating means, in the form of a calibrated wheel fixed to the spindle, is visible through a window in the machine housing to allow the setting to be read off.

According to other features of this invention, instead of a spring arrangement to hold the blade in firm contact with the guide body, a pair of guide bodies with respective tracks are provided, coupled to the adjustment means so that they form a channel in which the blade rides and which is displaceable toward and away from the table edge. Here also the guide-body arrangement is provided to both sides of the blade. This mechanism provides positive (nonyielding) guidance of the movable shear blade.

DESCRIPTION OF THE DRAWING

The above and other objects, features and advantages will become apparent from the following description, reference being made to the accompanying drawing, in which:

FIG. 1 is a side sectional view through an apparatus according to the present invention;

FIG. 1a is an enlarged view of a detail of FIG. 1;

FIG. 2 is a section taken along line II — II of FIG. 1;

FIG. 3 is a detail view showing an alternative embodiment of the present invention;

FIG. 3a is a section taken along line IIIA — IIIA of FIG. 3, in enlarged scale; and FIG. 4 is a detail view showing yet another embodiment of the present invention.

SPECIFIC DESCRIPTION

As seen in FIGS. 1, 1a and 2 the table shear according to the invention has a table 1 provided at its edge with a fixed lower blade 2. Another cutting edge 6 mounted on the edge of a vertical plate is displaceable in a plane P orthogonal to the table and cooperates with the edge blade 2 to cut off that portion of a workpiece W that projects beyond the table edge. Means 30, such as a hydraulic cylinder or flywheel and one-way clutch arrangement, is provided which can be actuated by the machine operator to pull the blade 5, 6 down, its return movement being effected by a spring. A hold-down device 11 is also provided in the machine housing 10 to clamp the workpiece W against the table 1 during cutting. This device 11 clamps the workpiece W just before the blade 5, 6 descends to cut off the projecting portion.

The upper blade 5, 6 rides at each side on a side 21b of a guide body 21 having another side 21a slidable along a face 20a of a fixed guide body 20. Both the bodies 20 and 21 are substantially wedge shaped so that their outwardly directed sides 21b and 20b are substantially parallel, although only the body 21 must be so shaped. A pair of extension springs 7 each connected at one end to a pin 32 fixed in the housing 10 and at the other end to a pin 31 fixed on the blade plate 5. These springs 7 hold the blade 5, 6 in tight but yielding contact with the surface 21b. Laterally, the blade is guided by rollers 8 which lie in a plane parallel to the plane P and engage rails 9 fixed to side plates 3 in turn screwed to the housing 10 and serving as mounts for the plates 20.

An adjusting mechanism 4 is provided to each side of the blade and includes the two bodies 20 and 21 and a threaded spindle 22 received in a bore 23 in one of the bodies 21, with the bore 23 lying on an axis A parallel to the surfaces 20a and 21a. Each spindle 22 is provided with a stop disk 24 which is received with virtually no play in a notch 28 formed in the body 20. In this manner rotation of the spindle 22 about its axis A moves the body 21 relative to the fixed body 20, thereby moving the blade 5, 6 toward or away from the table edge 2 and simultaneously displacing the plane P.

The spindles 22 are each formed at their extreme upper ends with a square-section region that can mate with a wrench 27 inserted through a hole 29 in the housing to permit adjustment. A window 26 with a hairline 26' cooperates with a calitrated scale 24' on the disk 24 to allow the setting to be read. In the embodiment shown in FIGS. 1, 1a and 2 the spindle 22 has a right-hand thread with a pitch of 1 millimeter and the slope of the wedge-like body's surface 21a relative to its surface 21b is 20:1, i.e. the rise is 1 mm/20 mm of displacement. With 50 markings equispaced around the scale 24' each marking corresponds to a displacement of the plane P by 0.001 millimeter. Thus, a very fine and accurate adjustment is possible.

FIGS. 3 and 3a show an alternative embodiment having two fixed guide bodies 20' and 20" each formed with a keyway 36 receiving an outwardly diverging key 37 in turn formed on a pair of oppositely directed wedge-like guide bodies 21' and 21". The guide arrangement 4' constituted thereby corresponds substantially to that of FIG. 1 as far as the bodies 20' and 21' and their spindle 22 are concerned. However, here the spindle 22 carries a gear wheel 33 meshing with a gear wheel 35 fitted to a spindle 34 received in the body 21" and formed with left-hand threads. The gear wheel 35 is received without play in a notch 40 cut into the body 20" so that the spindle 34 is axially fixed.

Rotation of the spindle 22 thus causes the spindle 34 to rotate in the opposite direction so that, since its threads are oppositely directed, the bodies 21' and 21" are pulled up together, or pushed down together. The two bodies 21' and 21" to each side of the blade 5, 6 thus define a channel in which the blade rides. No springs are needed in this embodiment since a very sturdy guide is provided. It is advantageous if the body 21' moves second on narrowing of the gap, and if it moves before the body 21" on enlarging the gap.

FIG. 4 shows another embodiment where structure identical to that of FIG. 1 has the same reference numerals. Instead of the springs 7, however, a plurality of rollers 38 which are loaded by springs 39 bear against the housing 10 to hold the blade plate 5 in firm contact with the guide body 21. It is necessary to ensure good contact between the blade and its guide body at all times. The guide surfaces and wedge may, of course, contact each other and the blade carrier over the full length of the blade.

I claim:

1. A shear comprising:

a table having an edge and adapted to receive a workpiece with a portion of said workpiece projecting beyond said edge;

a blade reciprocable adjacent said edge in a plane extending transversely to said table and defining a gap with said edge;

means for displacing said blade up and down for cutting said portion off said workpiece;

a wedge-shaped guide track adjacent said blade and fixed relative to said table;

a vertically displaceable wedge-shaped guide body having a first side parallel to said plane and engaging said blade and a second side inclined to said first side and engaging said guide track;

adjustment means actuatable to displace said guide body vertically in contact with said track for moving said plane toward and away from said edge, thereby adjusting said gap, said adjustment means including a threaded spindle extending substantially parallel to said track and threadedly engaging said body, and means on said track retaining said spindle against axial displacement;

at least one tension spring operatively connected to said blade and drawing same resiliently toward said track; and indicating means on said spindle for showing the the size of the gap, said indicating means including a calibrated disk rotatable with said spindle, said track being formed with a notch receiving said disk and axially fixing same.

* * * * *